United States Patent
Qiu et al.

(10) Patent No.: US 7,973,938 B2
(45) Date of Patent: Jul. 5, 2011

(54) BIAS-REDUCED FIBER OPTIC GYROSCOPE WITH POLARIZING FIBERS

(75) Inventors: Tiequn Qiu, Glendale, AZ (US); Steven J. Sanders, Scottsdale, AZ (US); Sorin Moser, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 289 days.

(21) Appl. No.: 12/236,644

(22) Filed: Sep. 24, 2008

(65) Prior Publication Data

US 2010/0073681 A1 Mar. 25, 2010

(51) Int. Cl.
*G01C 19/72* (2006.01)
(52) U.S. Cl. ........................................ 356/460
(58) Field of Classification Search .................... 356/460
See application file for complete search history.

(56) References Cited

U.S. PATENT DOCUMENTS

| | | | |
|---|---|---|---|
| 4,915,503 A * | 4/1990 | Pavlath | 356/460 |
| 5,187,757 A * | 2/1993 | Ohno et al. | 385/11 |
| 5,223,911 A * | 6/1993 | Suchoski et al. | 356/464 |
| 5,327,213 A | 7/1994 | Blake | |
| 5,347,354 A * | 9/1994 | Muller et al. | 356/466 |
| 5,602,642 A * | 2/1997 | Bergh et al. | 356/464 |
| 5,854,678 A * | 12/1998 | Liu et al. | 356/462 |
| 6,175,410 B1 * | 1/2001 | Szafraniec et al. | 356/459 |
| 6,744,966 B2 * | 6/2004 | Ang et al. | 385/147 |
| 6,801,319 B2 | 10/2004 | Szafraniec et al. | |
| 7,085,441 B1 * | 8/2006 | Kozlov | 385/11 |
| 7,777,889 B2 * | 8/2010 | Qiu et al. | 356/460 |
| 2004/0223160 A1 * | 11/2004 | Chen et al. | 356/460 |
| 2006/0258036 A1 * | 11/2006 | Moore et al. | 438/31 |
| 2007/0097374 A1 * | 5/2007 | Ren-Young | 356/460 |
| 2010/0033729 A1 * | 2/2010 | Qiu et al. | 356/460 |

* cited by examiner

*Primary Examiner* — Patrick J Connolly
(74) *Attorney, Agent, or Firm* — Fogg & Powers LLC

(57) ABSTRACT

A fiber optic gyroscope includes a light source, a coupler coupled to the light source, a photodetector coupled to the coupler, an integrated optic circuit (IOC) coupled to the coupler by a first element, and a sensing loop coupled to the IOC by second and third elements. At least one of the first, second and third elements includes a polarizing element.

20 Claims, 11 Drawing Sheets

BIAS-REDUCED FIBER OPTIC GYROSCOPE WITH POLARIZING FIBERS

GOVERNMENT INTEREST

This invention was made with United States Government support under Government Contract No. N00030-08-C-0010. The Government has certain rights in the invention.

BACKGROUND OF THE INVENTION

In a fiber optic gyroscope, Sagnac phase for rotation rate sensing is determined by measuring the intensity of interfering lightwaves traveling through an identical optical path of a fiber loop in opposite directions (e.g., the clockwise (CW) and counterclockwise (CCW) directions). Such an identical optical path involves a reciprocal path from both spatial and polarization-mode points of view. The correct Sagnac phase is measured only when the CW and CCW travelling lightwaves travel in the same polarization state while within the same sections of loop fibers. The so-called polarization errors occur if such lightwaves travel in different polarization modes while within the same section of loop fibers.

Conventional single-mode optical fibers, either polarization maintaining (PM) or non-polarization maintaining, normally support two polarization modes. Due to cross-couplings at fiber splices and birefringence disturbance in the fiber, there is always energy exchange between the two polarization modes. Interference of polarization cross-coupled lightwaves with the primary lightwaves or with other cross-coupled lightwaves introduces error signals that do not carry the correct phase information for rotation sensing, and thus must be avoided and reduced.

From the standpoint of reducing polarization error, PM fiber sensing coil is preferable due to smaller polarization-mode cross-couplings in the fiber. However, even PM fibers are susceptible to non-zero cross-couplings due to micro bending and non-uniform stress built into the fiber during the manufacturing process. The strength of these cross-couplings is typically characterized by an h-parameter. PM fiber coil with large value of h-parameter may result in larger polarization errors that degrade the gyroscope bias performance.

In a depolarized gyroscope, non-polarization maintaining single mode (SM) fiber is used for cost reduction and/or improved resistance to radiation. There are ways to design the optical circuit so that the polarization errors are reduced to a relatively low level. Still, most of these methods require high polarization extinction ratio (PER), $\epsilon$, of the integrated optical circuit (IOC) or of a polarizer (in case an IOC is not used) because all of the polarization errors are proportional to either $\epsilon$ or higher orders of same. However, in many cases, the PER of an IOC or of a single polarizer is not high enough, and the polarization error may not be small enough for certain applications of the gyroscope.

Referring to FIG. 1, apparatus 1 is a typical prior-art interferometric fiber optic gyroscope that includes a broadband light source 11, a directional coupler 12, a photodetector 14, an integrated optic circuit (IOC) 16, a sensing loop 10, and fiber sections 15, 210 and 220 that connect the IOC to the coupler and the sensing loop. The sensing loop 10 may include a polarization-maintaining (PM) fiber coil or non-PM single-mode (SM) fiber coil. The IOC 16 includes a Y-shape waveguide 40, which splits the input lightwaves into substantially equal parts at junction 17, a polarizer 18, and electrodes 19 for phase modulation. In one typical configuration, the IOC waveguide 40 may be the polarizing element instead of containing the polarizer 18. The fiber sections 15, 210 and 220 may be Lyot-type depolarizers, each including two PM fiber sections with their birefringent axes oriented 45° with respect to each other. In these prior art apparatuses, the only polarizing (PZ) element is often the IOC 16. They may not have high enough PER to reduce polarizations errors below required level.

SUMMARY OF THE INVENTION

In an embodiment, a fiber optic gyroscope includes a light source, a coupler coupled to the light source, a photodetector coupled to the coupler, an integrated optic circuit (IOC) coupled to the coupler by a first element, and a sensing loop coupled to the IOC by second and third elements. At least one of the first, second and third elements includes a polarizing element.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

An embodiment pertains to interferometric fiber optic gyroscopes (IFOGs) and, more particularly, the embodiments of the present invention pertain to design approaches for reducing polarization errors by using polarizing elements in gyroscope optical circuits.

With the development and availability of compact polarizing components, such as polarizing fibers having small internal polarization cross-couplings and high polarization extinction ratios, it is advantageous to use these additional polarizing elements in certain sections of the optical circuit or even in the sensing coil of a gyroscope to reduce polarization errors.

Embodiments of the invention present several approaches to reduce polarization error by using polarizing elements in certain sections of the optical circuit of gyroscopes. An embodiment of a fiber optic gyroscope includes a light source, an optical directional coupler, an integrated optical circuit (IOC) typically having one input port and two output ports, a sensing loop, and at least one polarizing element between the optical coupler and the IOC input port, and/or at least one polarizing element between the loop and the IOC output ports. The polarizing elements are preferably polarizing fibers having a high polarization extinction ratio. In another embodiment, the polarizing fiber may also be used as the sensing coil fiber.

Adding additional polarizing elements in concatenation with an IOC is advantageous to increase the rejection of unwanted polarization modes. Alternatively, this approach allows significant relaxation of the performance requirements of many optical elements, such as IOC PER, IOC pigtail misalignment, splice polarization misalignments, coil birefringence or h-parameter, coupler polarization-dependent loss (PDL), depolarizer fiber length, etc., to meet a specific gyro bias stability requirement.

Figure 1:
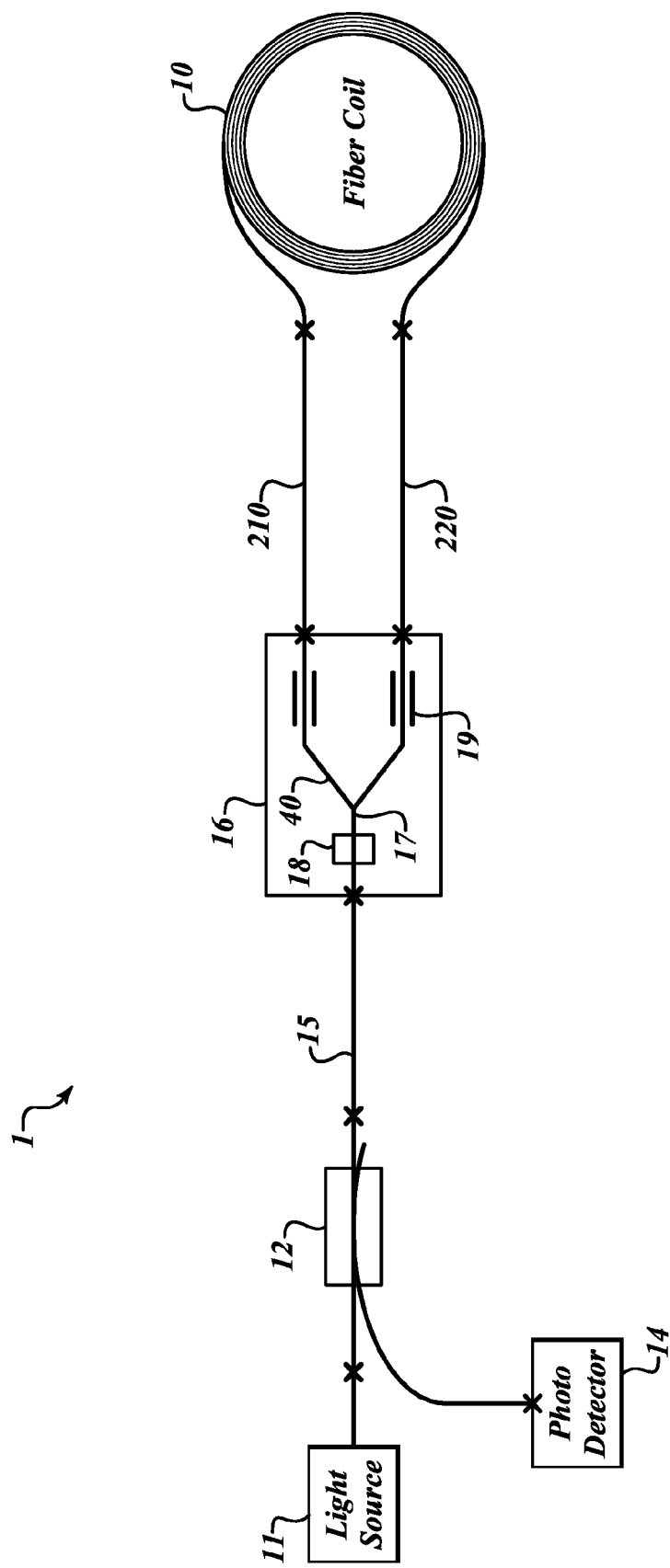
FIG. 1 is a schematic view of a prior-art fiber optic gyroscope.
Figure 2:
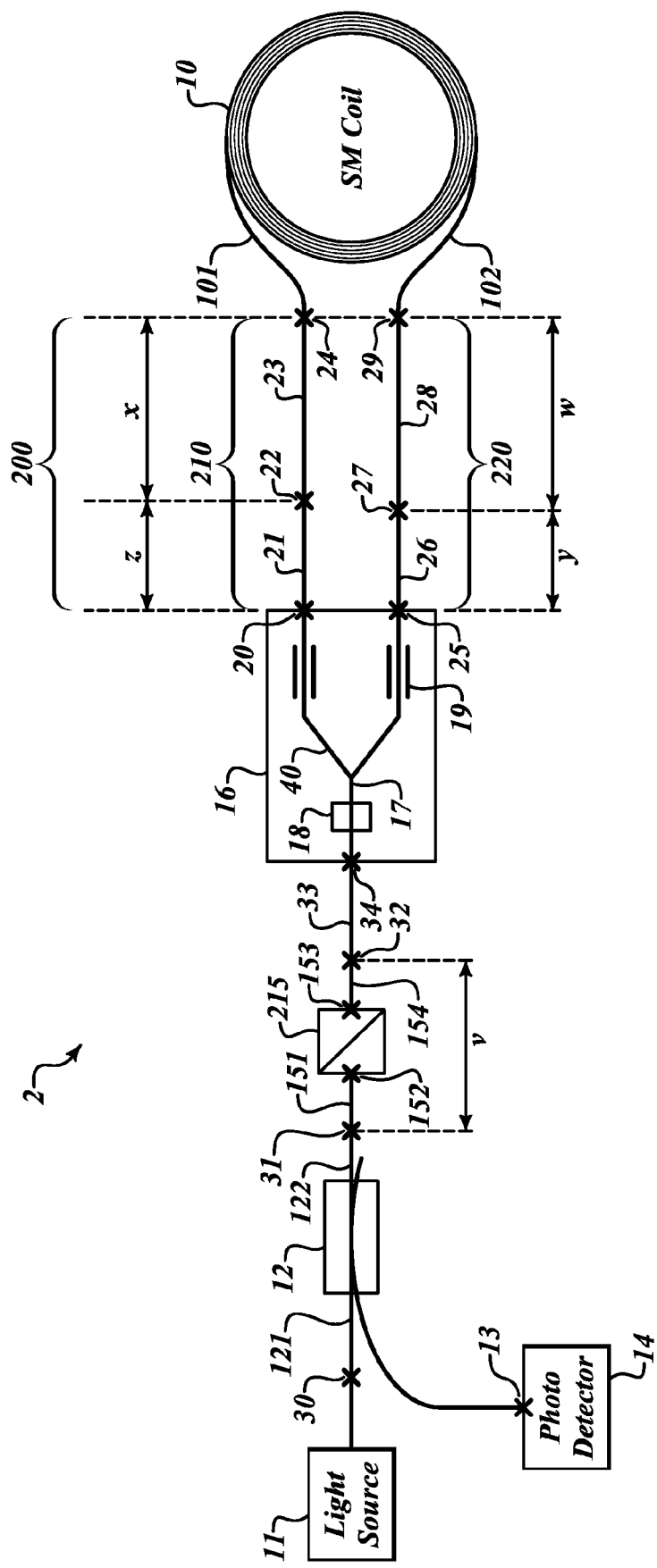
FIG. 2 is a schematic view of a depolarized fiber optic gyroscope according to an embodiment of the invention.

FIG. 2 shows a depolarized gyroscope 2 according to an embodiment of the invention. Components of the gyroscope 2 similar to those of apparatus 1 of FIG. 1 are designated in FIG. 2 by like reference numerals. In the embodiment illustrated in FIG. 2, a polarizing element 215 is disposed between the coupler 12 and an IOC 16.

The directional coupler 12 may be a fused fiber coupler, micro-optic coupler, lapped coupler, or optical circulator or equivalent device. Light waves from the broadband light source 11 passing through the directional coupler 12 are subsequently polarized by the polarizing element 215 before being coupled into the IOC 16. Polarizing element 215 may be a fiber-coupled optical polarizer or equivalent device that substantially transmits light of one polarization, while strongly suppressing the orthogonal polarization. The IOC 16 has an input port (disposed toward light source 11) and two output ports (disposed toward loop 10). Light waves entering the input port of IOC 16 are split into two substantially equal parts at junction 17; one propagates in the clockwise (CW) direction through the loop 10, and the other propagates in the counter-clockwise (CCW) direction through the loop 10. Loop 10 may be a non-PM single-mode (SM) fiber having leads 101 and 102 coupled to a depolarizer 200. Depolarizer 200 includes an upper section 210 and a lower section 220. The upper section 210 includes PM fiber segments 21 and 23, the optical axes of which are aligned substantially close to 45° at splice 22. The lower section 220 includes PM fiber segments 26 and 28, the optical axes of which are aligned substantially close to 45° at splice 27. The polarization axes of PM fiber 21 and 26 are aligned substantially close to 0° with respect to the pass axes of IOC waveguides 40 at output port splices 20 and 25. After propagating through the loop 10 and the depolarizer 200, the CW and CCW lightwaves combine at joint 17 and exit the IOC 16 input port. The exiting lightwaves pass through the polarizing element 215 and the coupler 12 before reaching the photo detector 14.

Figure 3:
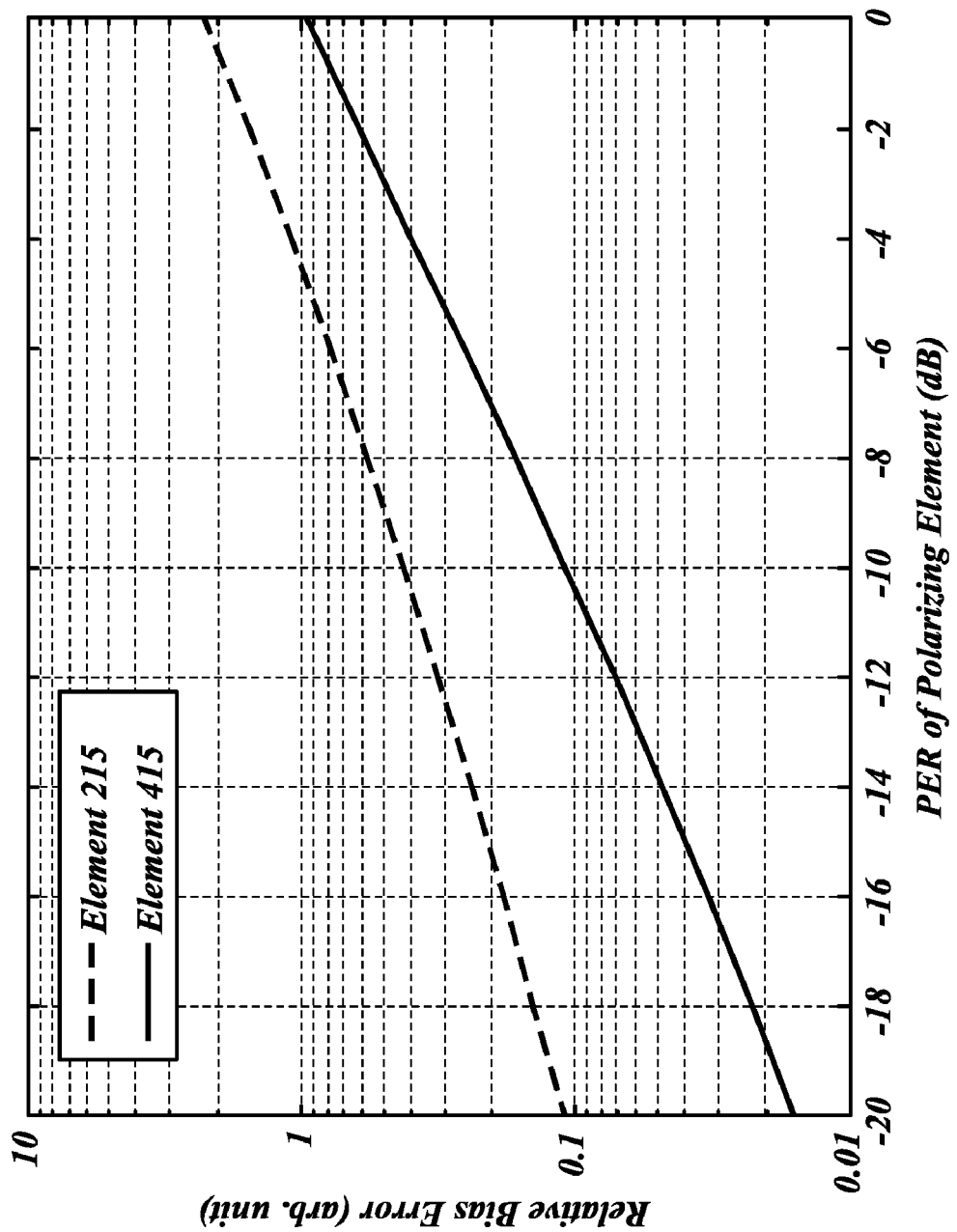
FIG. 3 is a plot of gyroscope relative bias error amplitude versus polarization extinction ratio associated with alternative embodiments of the invention.

The IOC 16 may include a LiNbO3 crystal substrate having polarizing waveguides that guide one polarization mode polarized along a pass axis and substantially rejects the other polarization mode polarized along a reject axis. The pass axis of the polarizing element 215 in the illustrated embodiment is aligned with the IOC pass axis. The added polarization discrimination by element 215 is advantageous to reduce the gyroscope polarization error. This can be clearly seen from the modeling results shown in FIG. 3. In a relative scale ("1" represents original bias error without polarizing element 215), the dashed line in FIG. 3 indicates that bias error decreases monotonically with the PER of element 215. In this embodiment, the use of a bulk polarizing component 15 may introduce new cross-coupling points of 152 and 153 at connection points to pigtail fibers. Since polarization errors are sensitive to these cross-couplings in the optical circuit, the extra cross-couplings of 152 and 153 may offset a certain amount of benefit provided by the polarizing element 215. This effect is shown by the dashed line in FIG. 3 with a larger than 1.0 relative bias error when PER is zero and non-zero cross-couplings at 152 and 153 are assumed.

Figure 4:
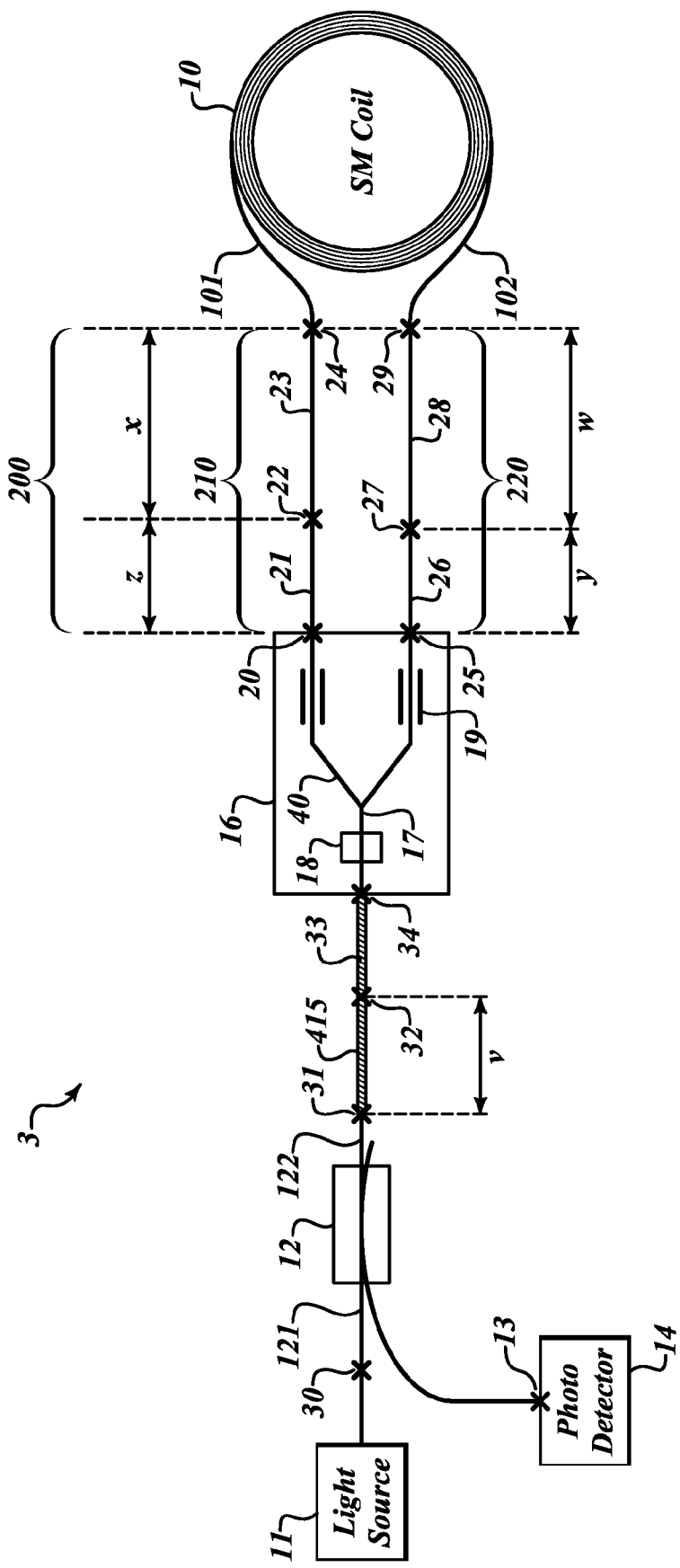
FIG. 4 is a schematic view of a depolarized fiber optic gyroscope according to an embodiment of the invention.

An alternative and possibly improved embodiment of the present invention is illustrated in FIG. 4. A depolarized gyroscope 3 incorporates a polarizing fiber 415 (instead of a bulk polarizing element 215) between the coupler 12 and the input port of an IOC 16. Polarizing fibers, such as fiber 415, function to transmit light of one polarization while strongly suppressing the orthogonal polarization. The IOC input pigtail 33 may be either a polarizing fiber or a non-polarizing PM fiber. However, selecting IOC input pigtail 33 to be the same type of polarizing fiber as fiber 415 is preferred because smaller cross-coupling at splice 32 can be achievable due to easier splicing of the same type of fibers. In the embodiment illustrated in FIG. 4, polarizing fiber 415 has no or very small internal cross-coupling points, and does not introduce additional polarization errors. The impact of the polarizing fiber 415 PER on the bias performance is shown by the solid line in FIG. 3. Compared to the dashed line for the previously described embodiment, using a bulk polarizing element 215, the steeper dependence of bias versus PER and smaller bias error at PER=O indicate that polarizing fiber may be advantageous in reducing polarization errors. In addition, since no extra bulk component is introduced into the gyro optical circuit, this embodiment may be more compact and economic.

However, the functional difference of a polarizing fiber and a bulk polarizing element may not be significant, particularly if the internal cross-couplings of the latter are very small (e.g. smaller than −30 dB). For generality of the description of embodiments of the present invention, it should be noted that the term "polarizing element" can refer to either a polarizing fiber, such as polarizing fiber 415, or a bulk polarizing element, such as element 215. Polarizing fiber should be considered replaceable by other polarizing elements if not mentioned explicitly.

Figure 5:
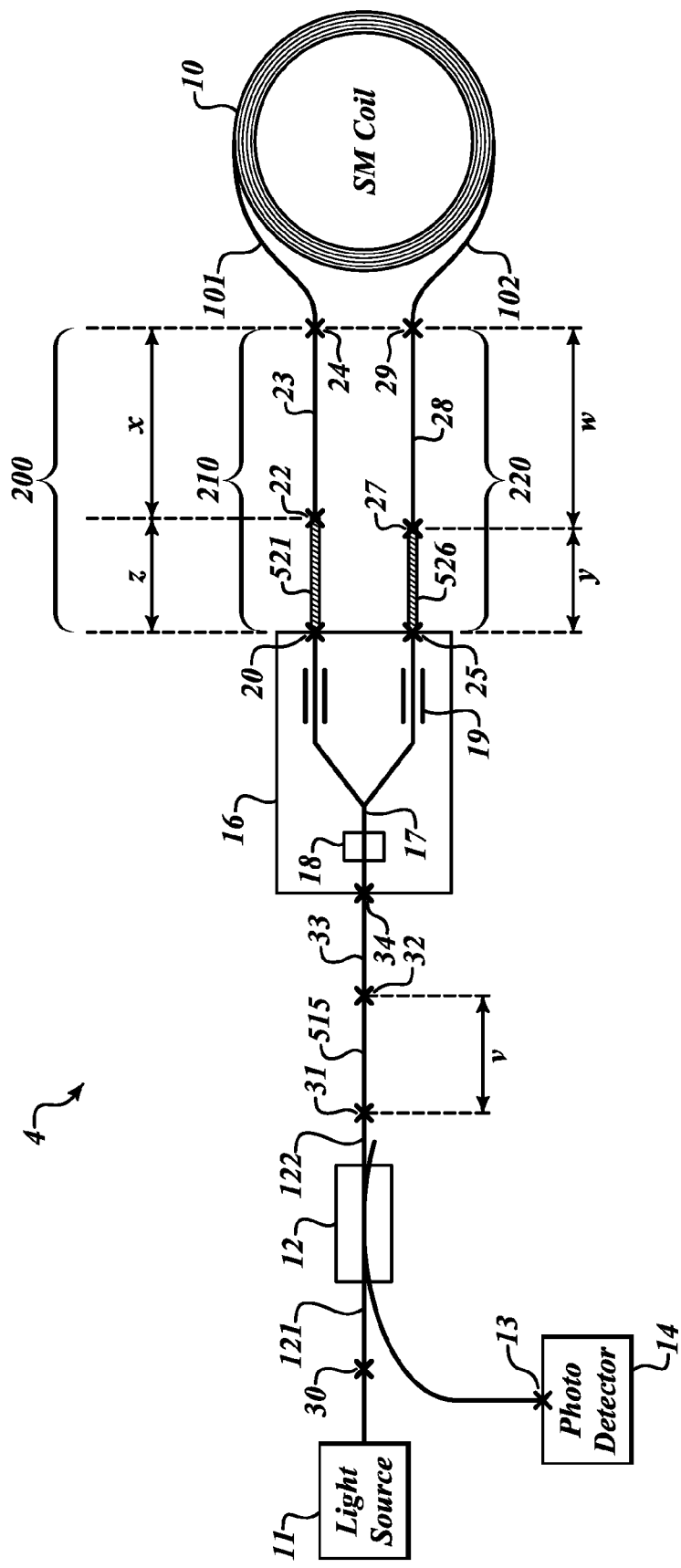
FIG. 5 is a schematic view of a depolarized fiber optic gyroscope according to an embodiment of the invention.
Figure 6:
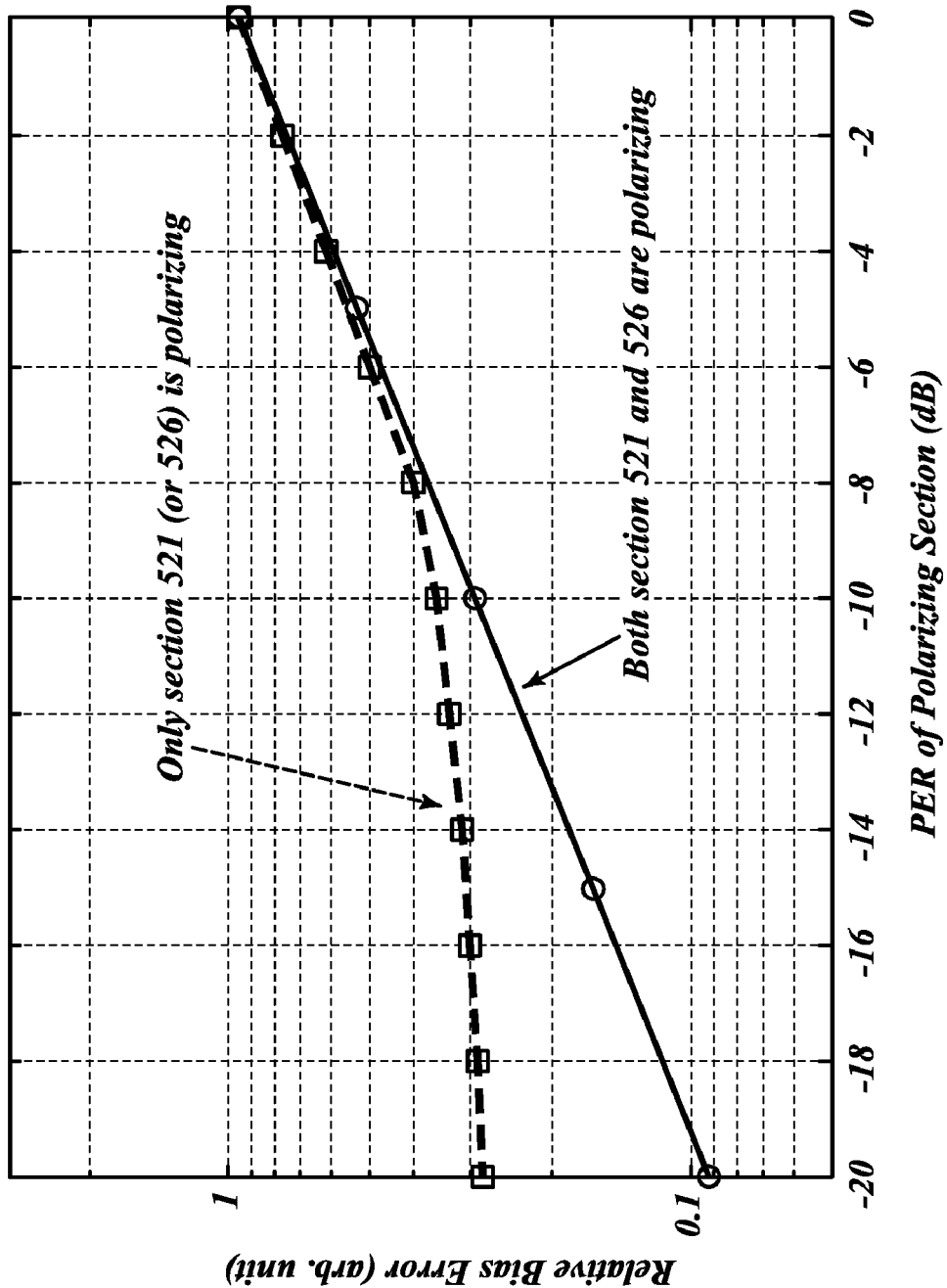
FIG. 6 is a plot of gyroscope relative bias error amplitude versus polarization extinction ratio associated with alternative embodiments of the invention.

An alternative embodiment of a depolarized fiber optic gyroscope 4 incorporating polarizing fibers is shown in FIG. 5. This embodiment includes polarizing fibers on at least one of the IOC 16 output port pigtails 521 and/or 526 instead of one or more input fibers as described with reference to the embodiment illustrated in FIG. 4. In the embodiment of FIG. 5, sections 23 and 28 may be non-polarizing PM fibers, the optical axes of which are aligned substantially close to 45° at splice 22 and 27 with respect to polarizing fibers 521 and 526. The effects of polarizing fiber section 521 and/or 526 on gyroscope bias performance are plotted in FIG. 6. To distinguish the effects of each polarizing section, two curves are plotted. The solid curve with circular symbols represents the case wherein both fiber sections 521 and 526 are polarizing fibers. The dashed curve with square symbols represents the case wherein only fiber section 521 or section 526 is a polarizing fiber. It has been found that the PER of −20 dB of two PZ sections can provide a factor of 10 reduction of polarization error. If only the section 521 or 526 is polarizing, the reduction of bias is less significant.

Figure 7:
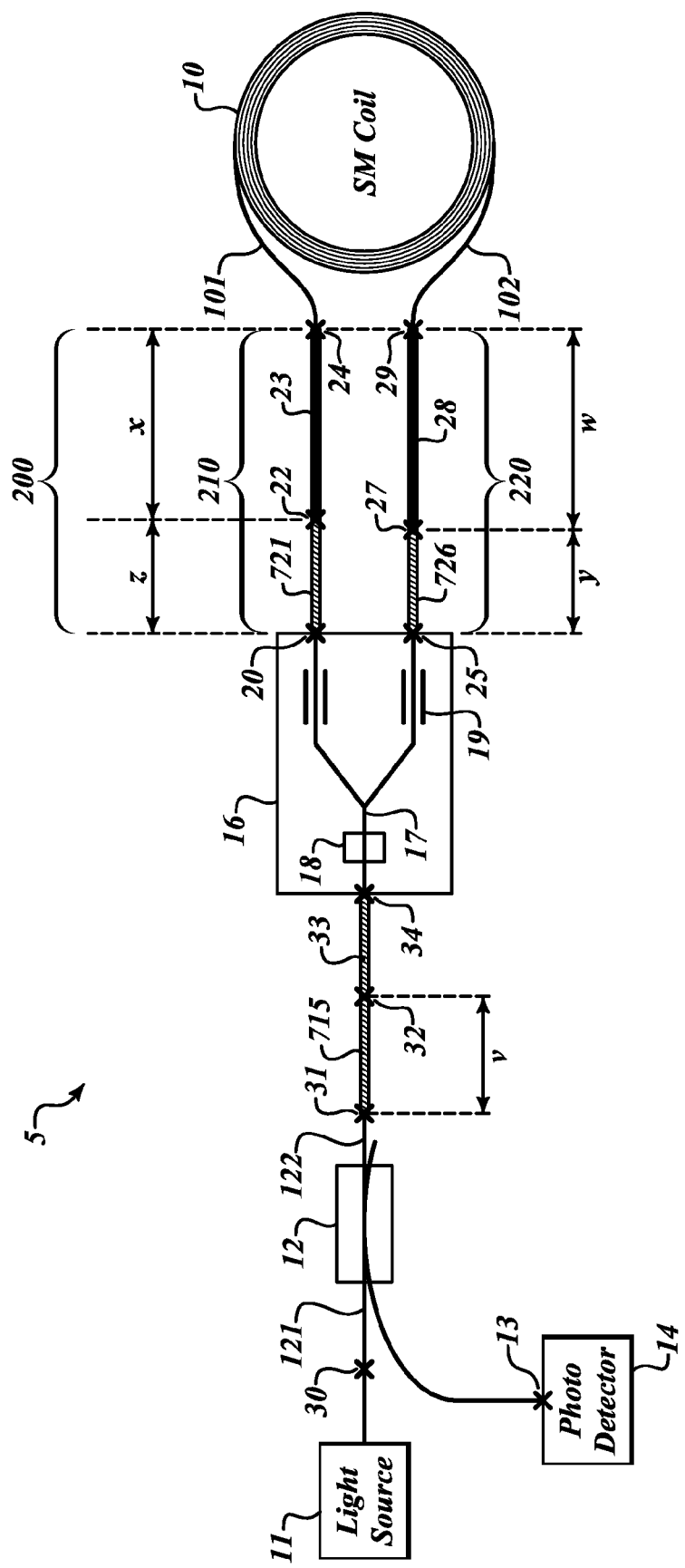
FIG. 7 is a schematic view of a depolarized fiber optic gyroscope according to an embodiment of the invention.

An alternative embodiment gyroscope 5 includes polarizing fiber sections on both the IOC input (section 715) and output pigtails (sections 721, 726), as shown in FIG. 7. The combined polarizing effect from this configuration can be more significant than is the case with the previously described embodiments.

Figure 8:
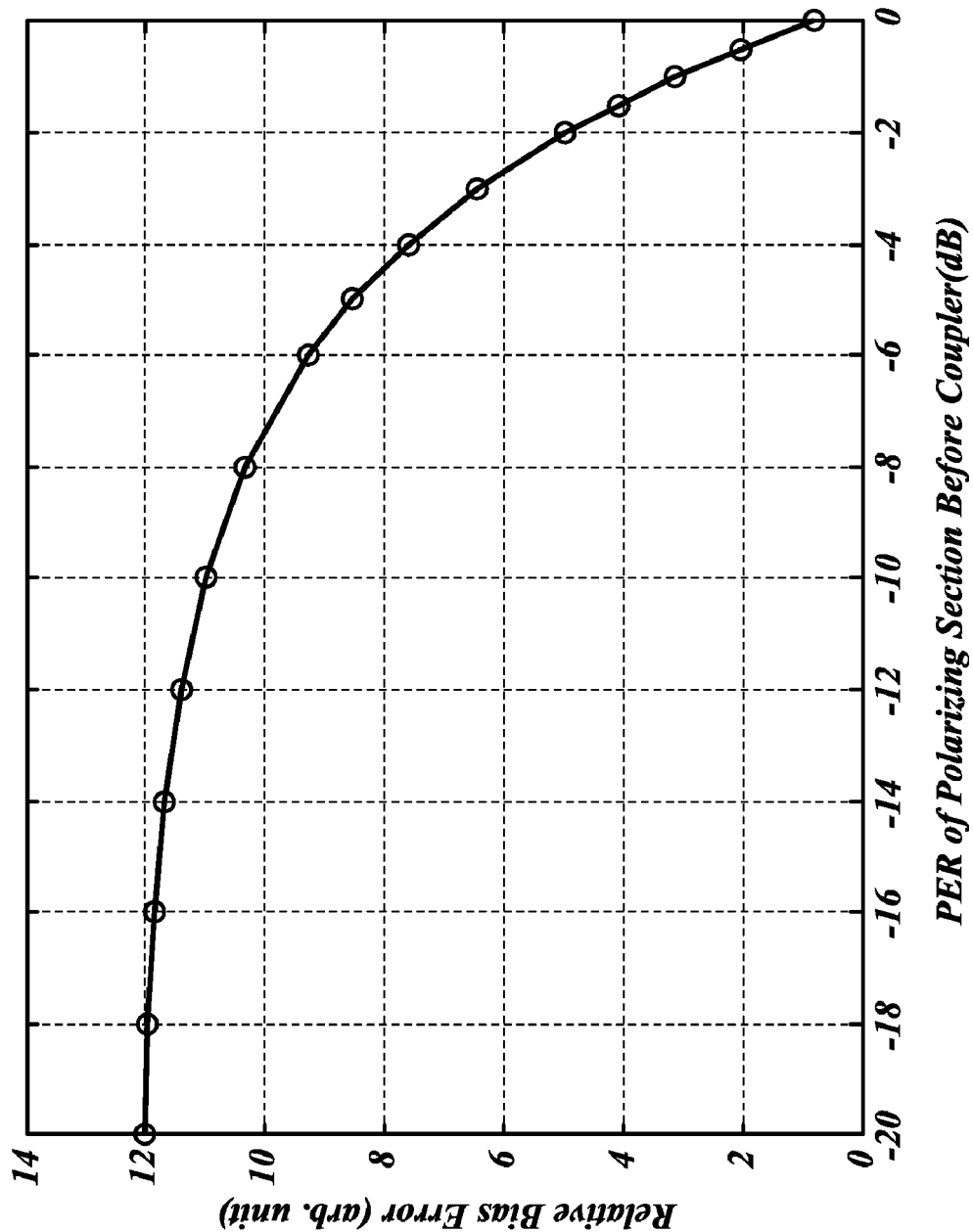
FIG. 8 is a plot of gyroscope relative bias amplitude as a function of polarization extinction ratio of an incorrectly placed polarizing element in an optical circuit.

It is worth noting that the choice of where to position polarizing elements in the gyroscope optical circuit should be made with care. For example, placing a polarizing element between the light source 11 and the coupler 12 may cause large polarization errors. FIG. 8 is a plot of modeled bias error versus the PER for a gyro with such an incorrectly placed polarizing element. It seems clear that polarizing the light source upstream of the coupler in a depolarized gyroscope can be disadvantageous. Similarly, it may be disadvantageous to use a polarizing directional coupler in place of the non-polarizing coupler because polarization errors could be significantly increased as a result of incorrect placement of the polarizing element.

Figure 9:
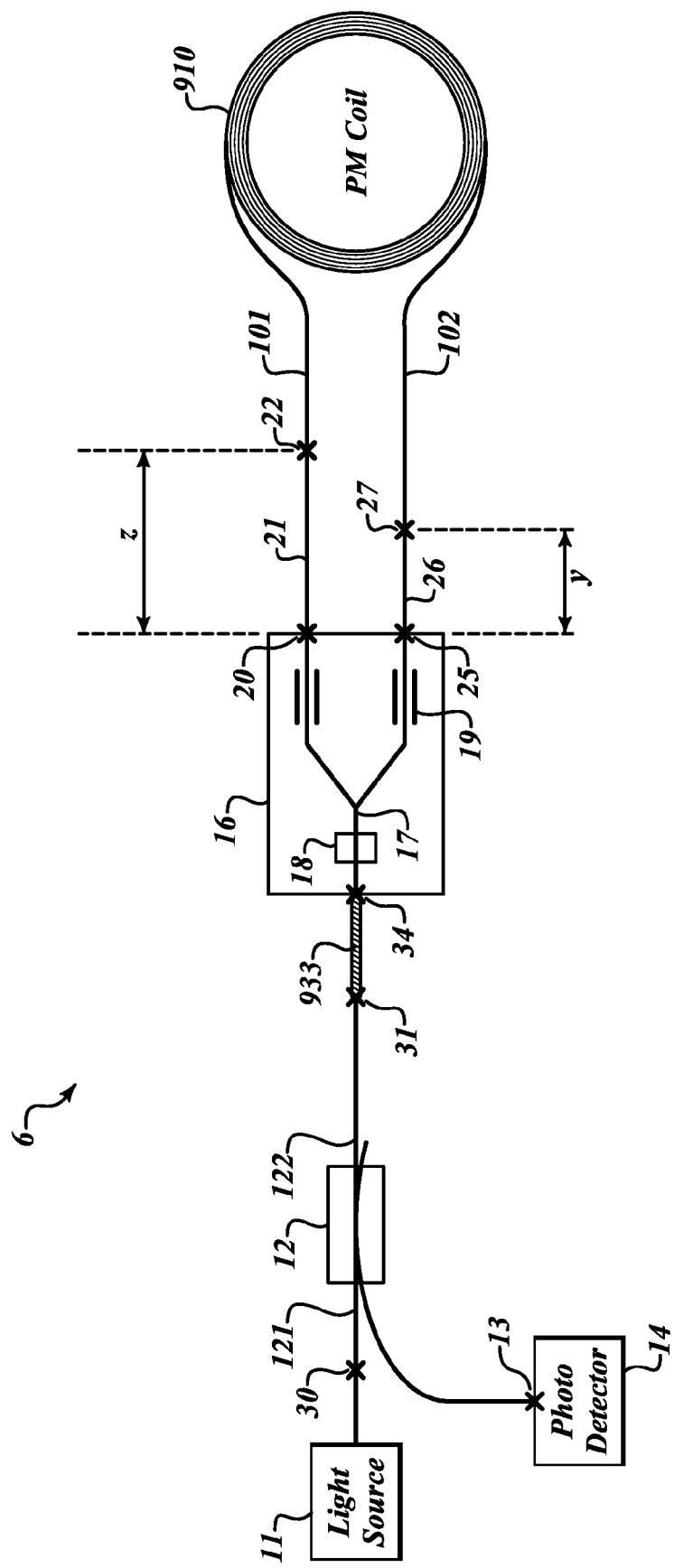
FIG. 9 is a schematic view of a PM fiber optic gyroscope according to an embodiment of the invention.

Principles of an embodiment of the invention can be applied to PM gyroscopes as well. Simulation shows that it may be advantageous to insert at least one additional polarizing element into a PM fiber optic gyroscope when the IOC PER does not exceed a specific value. Referring to FIG. 9, apparatus 6 is an embodiment of a PM gyroscope with a polarizing fiber 933 as the IOC input port pigtail fiber. In this embodiment, 910 is a PM fiber coil, 21 and 26 are normal PM fibers. The birefringence axes of PM, PZ fibers and IOC waveguides at splices 31, 34, 20, 22, 25, and 27 may all be substantially close to 0° with respect to each other to minimize polarization cross-coupling. Although the crosscoupling at 34 cannot be avoided, the overall reduction of polarization errors can still be significant if the PER of the polarizing fiber 933 is high enough.

Figure 10:
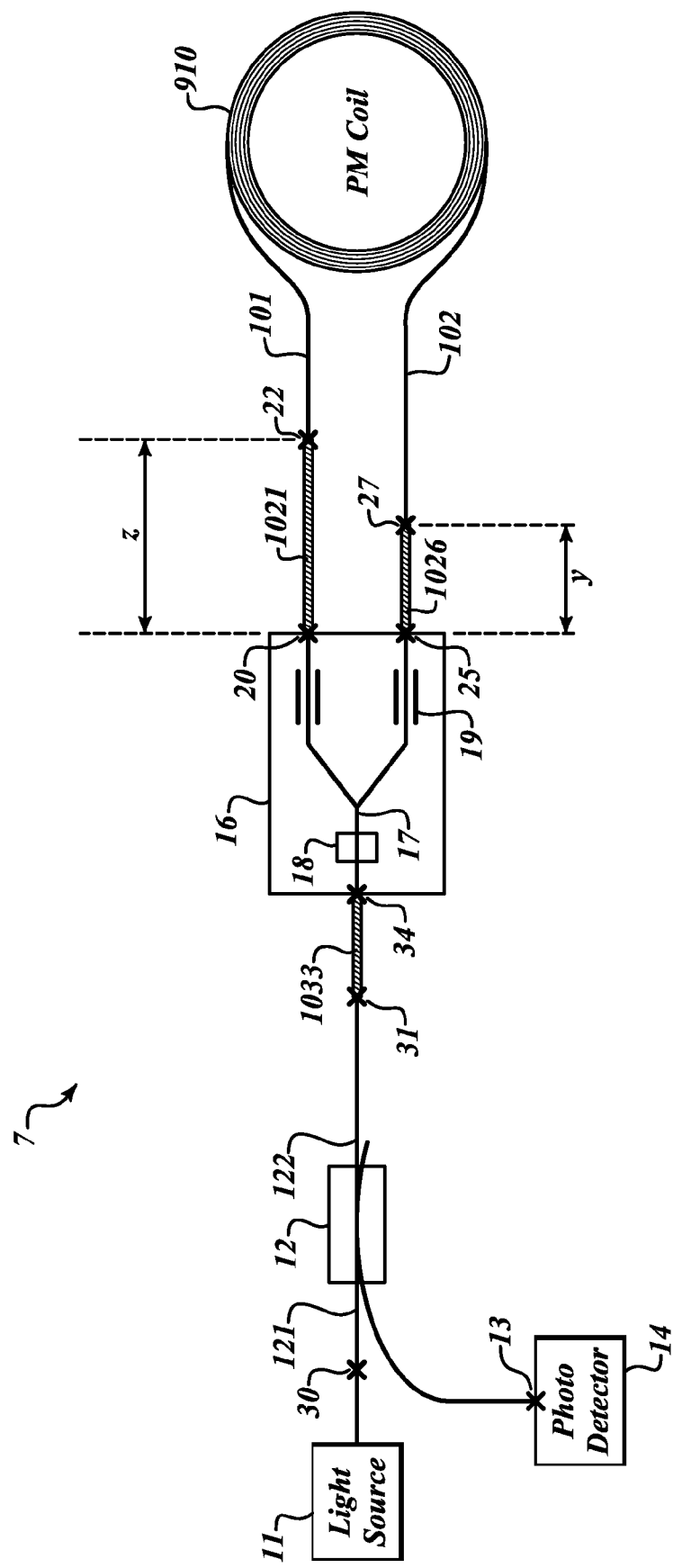
FIG. 10 is a schematic view of a PM fiber optic gyroscope according to an embodiment of the invention.

FIG. 10 shows an alternative embodiment of a PM gyroscope 7 having polarizing fibers as IOC pigtail fibers at both input (section 1033) and one or both output ports (sections 1021, 1026). Polarizing fibers 1033, 1021 and 1026 may provide significant reduction of polarization errors in this configuration. In addition, this configuration is advantageous in designing IOC waveguides to have a mode field shape that is optimized for a single type polarizing fiber.

Figure 11:
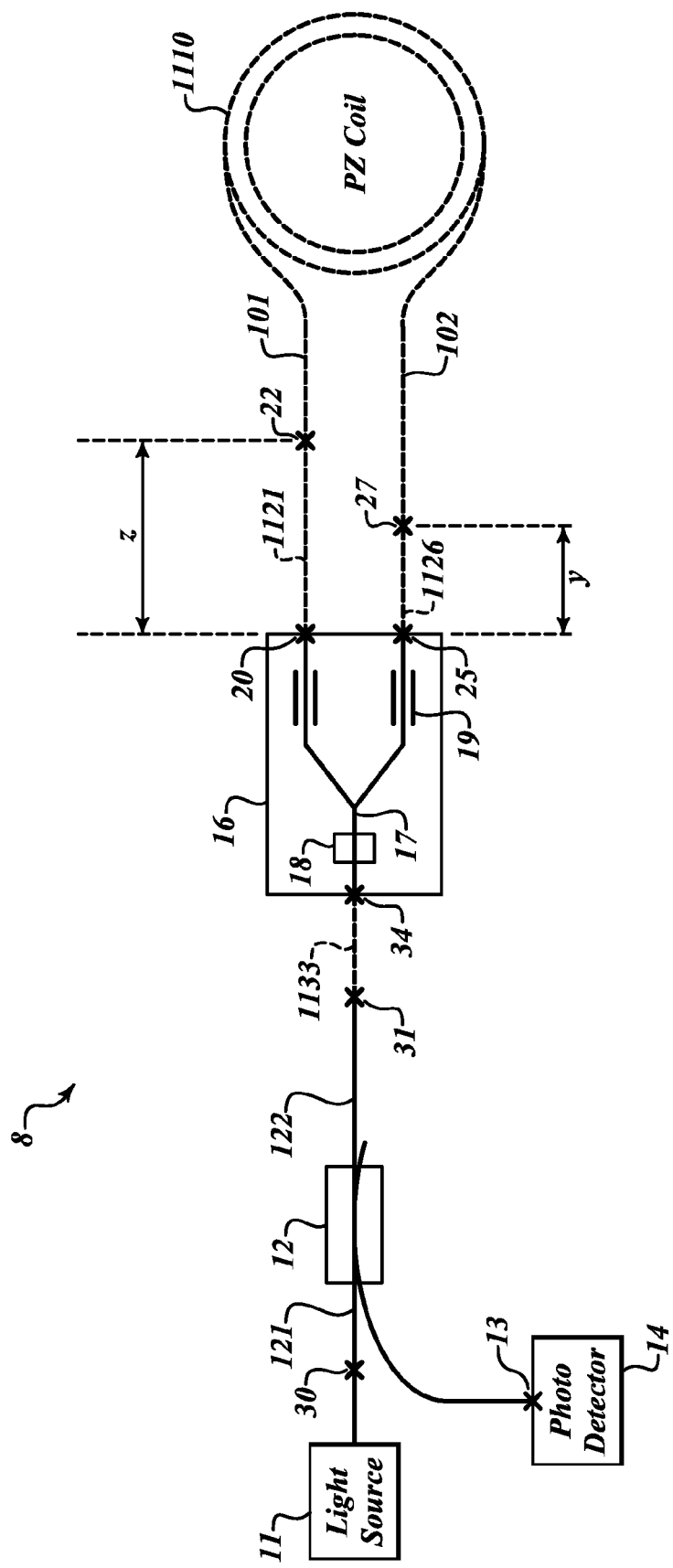
FIG. 11 is a schematic view of a PZ fiber optic gyroscope according to an embodiment of the invention.

Referring to FIG. 11, apparatus 8 is an alternative embodiment of the present invention incorporating polarizing fiber to reduce polarization errors. In this embodiment, the entire sensing coil 1110 and the fiber sections 1121 and/or 1126 are polarizing fibers. IOC input pigtail fiber 1133 may also be the same-type or other polarizing fiber. In this configuration, spurious light of the unwanted polarization mode may be reduced to a significantly lower value. The requirement of IOC PER can thus be significantly relaxed.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A fiber optic gyroscope, comprising:
   a light source;
   a coupler coupled to the light source;
   a photodetector coupled to the coupler;
   an integrated optic circuit (IOC) coupled to the coupler by a first polarizing fiber;
   and a sensing loop coupled to the IOC by second and third elements.

2. The gyroscope of claim 1 wherein the sensing loop comprises a single mode fiber.

3. The gyroscope of claim 1 wherein the second element comprises a polarizing fiber.

4. The gyroscope of claim 3 wherein the third element comprises a polarizing fiber.

5. The gyroscope of claim 1 wherein the first polarizing fiber substantially blocks propagation of light of a first polarization state and passes light of a second polarization state.

6. The gyroscope of claim 5, further comprising a second polarizing fiber coupling the first polarizing fiber to the IOC.

7. The gyroscope of claim 6 wherein the first and second polarizing fibers are of the same type.

8. The gyroscope of claim 1 wherein the sensing loop comprises at least one polarizing fiber.

9. A fiber optic gyroscope, comprising:
   a light source;
   a coupler coupled to the light source;
   a photodetector coupled to the coupler;
   an integrated optic circuit (IOC) coupled to the coupler by a first element; and
   a sensing loop coupled to the IOC by second and third elements, at least one of the second and third elements being a polarizing fiber.

10. The gyroscope of claim 9 wherein the sensing loop comprises a fiber coil.

11. The gyroscope of claim 9 wherein the first element comprises a polarizing fiber.

12. The gyroscope of claim 9 wherein the second and third elements comprise polarizing fibers.

13. The gyroscope of claim 11, further comprising a second polarizing fiber coupling the first polarizing fiber to the IOC.

14. The gyroscope of claim 13 wherein the first and second polarizing fibers are of the same type.

15. The gyroscope of claim 9 wherein the sensing loop comprises at least one polarizing fiber.

16. A fiber optic gyroscope, comprising:
   a light source;
   a coupler coupled to the light source;
   a photodetector coupled to the coupler;
   an integrated optic circuit (IOC) coupled to the coupler with at least a first polarizing fiber; and
   a sensing loop coupled to the IOC at a first end by a second polarizing fiber.

17. The fiber optic gyroscope of claim 16, further comprising:
   a third polarizing fiber coupled between the coupler and the first polarizing fiber.

18. The fiber optic gyroscope of claim 16, wherein the sensing loop is further coupled to the IOC by a third polarizing fiber.

19. The fiber optic gyroscope of claim 16, wherein the sensing loop comprises at least one polarizing fiber.

20. The fiber optic gyroscope of claim 16, further comprising:
   a photo detector coupled to the coupler; and
   a third polarizing fiber coupled between the coupler and the first polarizing fiber;
   wherein the sensing loop is coupled to the IOC at a second end by a fourth polarizing fiber; and
   wherein the sensing loop comprises at least one polarizing fiber.

* * * * *